United States Patent [19]
Ohmori et al.

[11] 3,720,767
[45] March 13, 1973

[54] FUNGICIDAL COMPOSITION COMPRISING COPPER 8-OXYQUINOLATE AND COPPER α-AMINO-γ-ETHYL-THIOBUTYRATE

[75] Inventors: Kaoru Ohmori, Yono-shi, Saitama-ken; Mituo Nakajima, Yatomachi, Saitama-ken; Shuichi Ishida, Ohmi-ya-shi; Shiroh Asaka, Yono-shi, Saitama-ken, all of Japan

[73] Assignee: Nippon Kayaku Kabushiki Kaisha, Tokyo, Japan

[22] Filed: June 6, 1969

[21] Appl. No.: 831,252

[30] Foreign Application Priority Data

June 21, 1968 Japan..................................43/42509

[52] U.S. Cl. ..................424/245, 424/294, 424/287, 424/289, 424/293, 424/295
[51] Int. Cl. ..........................A01n 9/02, A01n 21/00
[58] Field of Search......................424/245, 287, 289

[56] References Cited
UNITED STATES PATENTS 2,799,615   7/1957   Heymons et al......................424/245
2,872,469   2/1959   Stevens.............................424/289 X Primary Examiner—Albert T. Meyers
Assistant Examiner—D. Moyer
Attorney—Lane, Aitken, Dunner & Ziems

[57] ABSTRACT

The present invention relates to fungicidal compositions for agricultural and horticultural use comprising one or more kinds of metal salts of α-amino-γ-ethylthio butyric acid such as copper α-amino-γ-ethylthio butyrate, or manganese α-amino-γ-ethylthio butyrate and one or more kinds of 8-oxyquinoline metal complex, such as copper or zinc 8-oxyquinolate along with adjuvants such as dispersing agent, emulsifier, or wetting agent. The composition of the present invention is remarkably effective when applied at low concentration for black spot of pear (*Alernaria kikuchiana*) or Helminthosporium leaf spot (*Cochliobolus miyabeanus*).

1 Claim, No Drawings

FUNGICIDAL COMPOSITION COMPRISING COPPER 8-OXYQUINOLATE AND COPPER α-AMINO-γ-ETHYL-THIOBUTYRATE

The present invention relates to fungicidal compositions for agricultural and horticultural use containing one or more kinds of metal salts of α-amino-γ-ethylthiobutyric acid and one or more kinds of metal complex of 8-oxyquinoline, as the active ingredients.

Among the above given active ingredients, copper 8-oxyquinolate which is a typical metal complex of 8-oxyquinoline, is already used practically as a fungicide with almost no resulting phyto toxicity against plant life or almost no side effects upon exposure to human beings and cattle.

However, when compared with other fungicides, there is a drawback in that the fungicidal effect is inferior.

On the other hand, the other active ingredient, i.e., the metal salt of α-amino-γ-ethylthiobutyric acid (hereinafter α-amino-γ-ethylthio butyric acid referred to as ethionine) has the drawback that the fungicidal effect is inferior.

It has now been discovered that by combining a metal complex of 8-oxyquinoline with the metal salts of ethionine both of which had previously exhibited inferior fungicidal activities a mixture is produced which has outstanding fungicidal activity even when applied at lower concentrations.

The fungicidal compositions of the present invention is generally used for the control of pathogenic fungi, but it has remarkable effect against *Alternaria kikuchiana* (Black spot of pear) and *Cochliobolus miyabeanus* (Helminthosporium leaf spot of rice plant) and is not poisonous against human beings, cattle and plants.

As the metal complex of 8-oxyquinoline to be used in the present invention, the following are illustrative.

| Name of compounds | Melting point |
|---|---|
| 1. copper 8-oxyquinolate | above 270°C |
| 2. manganese 8-oxyquinolate | " |
| 3. zinc 8-oxyquinolate | " |
| 4. cobalt 8-oxyquinolate | " |
| 5. nickel 8-oxyquinolate | " |
| 6. iron 8-oxyquinolate | " |
| 7. lead 8-oxyquinolate | " |

As the metal salts of ethionine the following are illustrative;

| Name of compounds | Melting point |
|---|---|
| 1. copper ethonine | decomposed above 270°C |
| 2. manganese ethionine | " |
| 3. zinc ethionine | " |
| 4. cobalt ethionine | " |
| 5. nickel ethionine | " |
| 6. iron ethionine | " |
| 7. lead ethionine | " |

For a better understanding, the fungicidal effect of the mixtures of the present invention will be illustrated by the following experiments.

EXPERIMENT 1

SPORE GERMINATION TEST

The spores of *Alternaria kikuchiana* (Black spot of pear) was mixed in Hopkins medium (PH5) containing the predetermined concentration of the fungicidal compositions, and the spore germinating ratio was observed after 18 hours incubation, and the result is given in Table 1.

TABLE 1

| The names of compounds and the concentrations of active ingredients (mcg/ml) | | Spore germinating ratio (%) |
|---|---|---|
| Copper oxyquinolate | Copper ethionine | |
| 2.5 | 0 | 80.8 |
| 1.5 | 1.0 | 20.5 |
| 1.25 | 1.25 | 22.7 |
| 1.0 | 1.5 | 50.3 |
| 0 | 2.5 | 86.6 |
| Zinc oxyquinolate | Zinc ethionine | |
| 25 | 0 | 70.4 |
| 15 | 10 | 65.9 |
| 12.5 | 12.5 | 0 |
| 10 | 15 | 64.8 |
| 0 | 25 | 94.9 |
| Manganese oxyquinolate | Manganese ethionine | |
| 25 | 0 | 80.5 |
| 15 | 10 | 30.3 |
| 12.5 | 12.5 | 30.0 |
| 10 | 15 | 50.4 |
| 0 | 25 | 96.5 |
| Lead oxyquinolate | Lead ethionine | |
| 50 | 0 | 70.0 |
| 30 | 20 | 30.0 |
| 25 | 25 | 28.5 |
| 20 | 30 | 60.0 |
| 0 | 50 | 90.5 |
| Cobalt oxyguinolate | Cobalt ethionine | |
| 50 | 0 | 77.3 |
| 30 | 20 | 31.2 |
| 25 | 25 | 30.8 |
| 20 | 30 | 78.5 |
| 0 | 50 | 93.6 |
| Nickel oxyquinolate | Nickel ethionine | |
| 50 | 0 | 89.8 |
| 30 | 20 | 31.6 |
| 25 | 25 | 33.2 |
| 20 | 30 | 76.5 |
| 0 | 50 | 91.8 |
| Iron oxyquinolate | Iron ethionine | |
| 50 | 0 | 96.5 |
| 30 | 20 | 43.5 |
| 25 | 25 | 31.5 |
| 20 | 30 | 78.9 |
| 0 | 50 | 96.7 |
| Copper oxyquinolate | Zinc ethionine | |
| 25 | 0 | 60.0 |
| 15 | 10 | 20.0 |
| 12.5 | 12.5 | 10.0 |
| 10 | 15 | 31.2 |
| 0 | 25 | 59.5 |
| Zinc oxyquinolate | Manganese ethionine | |
| 25 | 0 | 70.4 |
| 15 | 10 | 63.0 |
| 12.5 | 12.5 | 21.5 |
| 10 | 15 | 74.0 |
| 0 | 25 | 96.5 |
| Manganese oxyquinolate | Lead ethionine | |
| 25 | 0 | 80.5 |
| 15 | 10 | 65.2 |
| 12.5 | 12.5 | 38.0 |
| 10 | 15 | 75.5 |
| 0 | 25 | 90.5 |
| Lead oxyquinolate | Cobalt ethionine | |
| 50 | 0 | 70.0 |
| 25 | 25 | 34.0 |
| 20 | 30 | 65.0 |
| 0 | 50 | 93.6 |
| Cobalt oxyquinolate | Nickel ethionine | |
| 50 | 0 | 77.3 |
| 25 | 25 | 43.5 |
| 20 | 30 | 55.2 |
| 0 | 50 | 91.8 |
| Nickel oxyquinolate | Iron ethionine | |
| 50 | 0 | 89.8 |
| 25 | 25 | 45.0 |
| 20 | 30 | 65.0 |
| 0 | 50 | 96.7 |
| Zinc oxyquinolate | Copper ethionine | |
| 5.0 | 0 | 99.3 |
| 2.5 | 2.5 | 43.0 |
| 0 | 5.0 | 78.8 |
| Manganese oxyquinolate | Copper ethionine | |
| 5.0 | 0 | 96.8 |
| 2.5 | 2.5 | 51.3 |
| 0 | 5.0 | 78.8 |
| Lead oxyquinolate | Copper ethionine | |

| | | |
|---|---|---|
| 5.0 | 0 | 97.8 |
| 2.5 | 2.5 | 53.5 |
| 0 | 5.0 | 78.8 |
| Cobalt oxyquinolate | Copper ethionine | |
| 5.0 | 0 | 98.2 |
| 2.5 | 2.5 | 61.0 |
| 0 | 5.0 | 78.8 |
| Nickel oxyquinolate | Copper ethionine | |
| 5.0 | 0 | 97.6 |
| 2.5 | 2.5 | 60.2 |
| 0 | 5.0 | 78.8 |
| Iron oxyquinolate | Copper ethionine | |
| 5.0 | 0 | 96.8 |
| 2.5 | 2.5 | 60.4 |
| 0 | 5.0 | 78.8 |

As is apparent from Table 1, the mixture of the present invention, i.e., metal complex of 8-oxyquinoline and metal salts of ethionine inhibited remarkably spore-germination of *Alternaria kikuchiana* when compared with the case in which each component was used respectively.

EXPERIMENT 2

The preventive effect on the disease of black spot of pear (*Alternaria kikuchiana*) by means of leaf detached test The detached leaf of pear (*Niju Seiki* species) was dipped into the solution containing the predetermined concentration of the fungicidal compositions, and it was taken out and dried, and thereafter spores of *Alternaria kikuchiana* were inoculated by means of spraying, and the inoculated leaf was kept the moist chamber at 27°C, and thereafter the degree of disease development was observed.

The obtained result is shown in Table 2 and Table 3.

The degree of the development of disease was classified into the following six grades.

| | | Index of disease development |
|---|---|---|
| Healthy | | 0 |
| Diseased area | 1– 20% | 1 |
| | 21– 40% | 2 |
| | 41– 60% | 3 |
| | 61– 80% | 4 |
| | 81–100% | 5 |

TABLE 2

| Names of compounds and the concentrations of active ingredients (mcg/ml) | | Index of disease development |
|---|---|---|
| Copper oxyquinolate | Copperethinonine | |
| 250 | 0 | 4.5 |
| 150 | 0 | 5.0 |
| 125 | 0 | 5.0 |
| 100 | 0 | 5.0 |
| 0 | 250 | 3.0 |
| 0 | 150 | 4.0 |
| 0 | 125 | 5.0 |
| 0 | 100 | 5.0 |
| 150 | 100 | 1.5 |
| 125 | 125 | 0.5 |
| 100 | 150 | 0.5 |
| Manganese oxyquinolate | Manganese ethionine | |
| 250 | 0 | 3.0 |
| 150 | 0 | 4.8 |
| 125 | 0 | 4.5 |
| 100 | 0 | 5.0 |
| 0 | 250 | 4.0 |
| 0 | 150 | 5.0 |
| 0 | 125 | 5.0 |
| 0 | 100 | 5.0 |
| 150 | 100 | 1.5 |
| 125 | 125 | 2.0 |
| 100 | 150 | 3.5 |
| Zinc oxyquinolate | Zinc ethionine | |
| 300 | 0 | 3.0 |
| 200 | 0 | 4.5 |
| 0 | 200 | 5.0 |
| 0 | 250 | 5.0 |
| 0 | 300 | 5.0 |
| 0 | 500 | 4.0 |
| 300 | 200 | 0.5 |
| 250 | 250 | 1.0 |
| 200 | 300 | 1.5 |
| Lead oxyquinolate | Lead ethionine | |
| 500 | 0 | 3.5 |
| 300 | 0 | 4.5 |
| 250 | 0 | 5.0 |
| 200 | 0 | 5.0 |
| 0 | 500 | 4.0 |
| 0 | 300 | 4.5 |
| 0 | 250 | 5.0 |
| 0 | 200 | 5.0 |
| 300 | 200 | 1.5 |
| 250 | 250 | 2.0 |
| 200 | 300 | 2.0 |
| Cobalt oxyquinolate | Cobalt ethionine | |
| 500 | 0 | 4.0 |
| 300 | 0 | 5.0 |
| 250 | 0 | 5.0 |
| 200 | 0 | 5.0 |
| 0 | 500 | 5.0 |
| 0 | 300 | 5.0 |
| 0 | 250 | 5.0 |
| 0 | 200 | 5.0 |
| 300 | 200 | 2.5 |
| 250 | 250 | 2.0 |
| 200 | 300 | 2.5 |
| Nickel oxyquinolate | Nickel ethionine | |
| 1000 | 0 | 4.0 |
| 500 | 0 | 4.5 |
| 250 | 0 | 5.0 |
| 0 | 1000 | 4.5 |
| 0 | 500 | 5.0 |
| 0 | 250 | 5.0 |
| 500 | 250 | 2.5 |
| 250 | 250 | 2.5 |
| Iron oxyquinolate | Iron ethionine | |
| 1000 | 0 | 4.5 |
| 500 | 0 | 5.0 |
| 250 | 0 | 5.0 |
| 0 | 1000 | 4.0 |
| 0 | 500 | 5.0 |
| 0 | 250 | 5.0 |
| 500 | 500 | 2.5 |
| 250 | 250 | 3.0 |
| Difoltan * | | |
| 250 | | 2.5 |

* N-tetrachloroethylthio-tetrahydrophthalimide

TABLE 3

| Names of compounds and the concentrations of active ingredients (mcg/ml) | | | Index of disease development |
|---|---|---|---|
| Manganese Oxyquinolate | Cobalt ethionine | Copper ethionine | |
| 250 | 0 | 0 | 4.5 |
| 150 | 0 | 0 | 5.0 |
| 125 | 0 | 0 | 5.0 |
| 100 | 0 | 0 | 5.0 |
| 0 | 250 | 0 | 4.0 |
| 0 | 150 | 0 | 5.0 |
| 0 | 125 | 0 | 5.0 |
| 0 | 100 | 0 | 5.0 |
| 0 | 0 | 250 | 3.0 |
| 0 | 0 | 150 | 4.0 |
| 0 | 0 | 125 | 5.0 |
| 0 | 0 | 100 | 5.0 |
| 100 | 100 | 50 | 1.5 |
| 50 | 50 | 150 | 0.5 |
| 25 | 25 | 200 | 1.0 |

EXPERIMENT 3

The preventive effect on the disease of Helminthosporium leaf sport of rice plant (*Cochliobolus miyabeanus*)

10 ml/pot of the solution containing the predetermined concentration of the fungicidal compositions was sprayed on 20 seedlings of rice plants at the stage of the three leaves in a pot, and after having dried the solution, the seedling were inoculated with spore suspension of *Cochliobolus miyabeanus* and kept in the moist chamber for overnight and thereafter kept in greenhouse, and 5 days after inoculation, the number of spots were counted.

The obtained results were shown in Table 4 and 5.

The preventive value in the table was calculated in accordance with the following equation;

Preventive value (%) = [ 1−(number of spots per one leaf of treated plot/number of spots per leaf of untreated plot) ] × 100

TABLE 4

| Names of compounds and the concentrations of active ingredients (ppm) | | Preventive value (%) |
|---|---|---|
| Copper oxyquinolate | Copper ethionine | |
| 200 | 0 | 40.5 |
| 150 | 50 | 87.9 |
| 100 | 100 | 92.8 |
| 50 | 150 | 81.7 |
| 0 | 200 | 43.2 |
| Zinc oxyquinolate | Zinc ethionine | |
| 500 | 0 | 48.2 |
| 250 | 250 | 89.4 |
| 0 | 500 | 55.3 |
| Manganese oxyquinolate | Manganese ethionine | |
| 500 | 0 | 63.4 |
| 250 | 250 | 88.2 |
| 0 | 500 | 64.3 |
| Lead oxyquinolate | Lead ethionine | |
| 500 | 0 | 62.1 |
| 250 | 250 | 70.0 |
| 0 | 500 | 32.7 |
| Cobalt oxyquinolate | Cobalt ethionine | |
| 500 | 0 | 41.8 |
| 250 | 250 | 48.6 |
| 0 | 500 | 35.5 |
| Nickel oxyquinolate | Nickel ethionine | |
| 500 | 0 | 42.2 |
| 250 | 250 | 50.9 |
| 0 | 500 | 30.4 |
| Iron oxyquinolate | Iron ethionine | |
| 500 | 0 | 45.5 |
| 250 | 250 | 60.2 |
| 0 | 500 | 23.9 |

TABLE 5

| Names of compounds and the concentrations of active ingredients (ppm) | | | Preventive value (%) |
|---|---|---|---|
| Copper oxyquinolate | Zinc ethionine | Copper ethionine | |
| 200 | 0 | 0 | 40.5 |
| 182 | 10 | 8 | 79.8 |
| 175 | 12 | 13 | 80.1 |
| 100 | 50 | 50 | 86.5 |
| 75 | 50 | 75 | 98.0 |
| 25 | 50 | 125 | 87.4 |
| 18 | 82 | 100 | 85.1 |
| 0 | 200 | 0 | 20.5 |
| 0 | 0 | 200 | 43.2 |

As is apparent from Table 4 and 5, the mixture of the present invention can effectively prevent Helminthosporium leaf spot of rice plant (*Cochlibolus miyabeanus*).

On the other hand, any phytotoxicity against rice plant was not observed at all.

In the mixture of the present invention, the most appropriate blending ratio can be determined in accordance with the growing condition and stage of the particular plant, but the mixing ratio of 1 part of one or more kinds of metal complex of 8-oxyquinoline and 0.1 to 10 parts of one or more kinds of metal salt of α-amino-γ-ethylthio butyric acid is the most preferable.

When the mixture of the present invention is practically used, it can be used in the form of powder, wettable powder, tablet or granule which is directly applied alone or by mixing along with carrier.

As the examples of carriers to be used in the present invention, clay, talc, diatomaceous earth, or bentonite or such like solid carriers can be given.

The fungicidal compositions according to this invention may also include adjuvants which are conventionally used in connection with agricultural chemicals such as a dispersing agent emulsifier wetting agent or binding agent.

The fungicidal compositions according to this invention in addition to the previously indicated active ingredients may also comprise a fungicide, insecticide, nematicide, herbicide, plant growth regulator, soil conditioner, fertilizer or such.

This invention is more concretely explained by the following examples.

Example 1

3 parts of manganese 8-oxyquinolate, 2 parts of manganese ethionine, and 95 parts of clay or talc were sufficiently mixed and crushed to prepare powder which is directly sprayed.

Example 2

12 parts of copper 8-oxyquinoline, 8 parts of copper ethionine, 77 parts of clay, and 3 parts of sodium higher alcohol sulfonate were sufficiently mix-crushed, and wetting agent was prepared.

Thus prepared wettable powder is readily dispered and suspended in water for fungicidal use.

We claim:
1. A fungicidal composition for agricultural and horticultural use which comprises a mixture of 1–3 parts by weight copper 8-oxyquinolate and 3–1 parts by weight copper α-amino-γ-ethylthiobutyrate.

* * * * *